United States Patent
Gussert

(12) 
(10) Patent No.: US 11,827,474 B2
(45) Date of Patent: Nov. 28, 2023

(54) ACCUMULATOR FOR PROCESSING LINE AND METHOD OF USING SAME

(71) Applicant: Paper Converting Machine Company, Green Bay, WI (US)

(72) Inventor: Cory P. Gussert, Pulaski, WI (US)

(73) Assignee: Paper Converting Machine Company, Green Bay, WI (US)

( * ) Notice: Subject to any disclaimer, the term of this patent is extended or adjusted under 35 U.S.C. 154(b) by 771 days.

(21) Appl. No.: 16/987,495

(22) Filed: Aug. 7, 2020

(65) Prior Publication Data

US 2021/0047140 A1 Feb. 18, 2021

Related U.S. Application Data

(60) Provisional application No. 62/887,723, filed on Aug. 16, 2019.

(51) Int. Cl.
| | | |
|---|---|---|
| B65H 19/30 | (2006.01) | |
| B65H 19/12 | (2006.01) | |
| B65G 1/127 | (2006.01) | |
| B65G 47/51 | (2006.01) | |

(52) U.S. Cl.
CPC ............ B65H 19/30 (2013.01); B65G 1/127 (2013.01); B65G 47/5145 (2013.01); B65H 19/126 (2013.01); *B65H 2301/4134* (2013.01); *B65H 2301/4171* (2013.01); *B65H 2301/413526* (2013.01); *B65H 2405/42* (2013.01)

(58) Field of Classification Search
CPC ................. B65H 19/30; B65H 19/126; B65H 2301/4134; B65H 2301/413526; B65H 2301/4171; B65H 2405/42; B65G 47/5113; B65G 47/5145; B65G 1/127

USPC .......................................... 198/347.1–347.4
See application file for complete search history.

(56) References Cited

U.S. PATENT DOCUMENTS

| | | | | |
|---|---|---|---|---|
| 2,745,410 A | * | 5/1956 | Desmond .................. | A24C 5/35 198/573 |
| 4,142,626 A | * | 3/1979 | Bradley ............. | B65G 47/5122 198/794 |
| 4,168,776 A | * | 9/1979 | Hoeboer ............... | B65H 19/305 198/797 |
| 5,759,326 A | * | 6/1998 | Vigneau .................. | B65H 19/29 156/193 |

(Continued)

OTHER PUBLICATIONS

International Search Report and Written Opinion for PCT/US2020/045337 dated Nov. 19, 2020.

*Primary Examiner* — James R Bidwell
(74) *Attorney, Agent, or Firm* — Thompson Coburn LLP

(57) ABSTRACT

A processing line processes logs of convolutely wound web material and has upstream and downstream sections. A main accumulator has buckets that receive, hold, and release logs. An input feeder receives logs from the upstream section and conveys them to a bucket of main accumulator. A loader has a loader accumulator and loader buckets that receive, hold, and release logs. A transfer conveyor between the main accumulator and the loader receives a log from the main accumulator bucket and conveys the log a loader bucket independently of the input feeder. The loader receives a log from the transfer conveyor. The loader conveys the log in the loader bucket to a discharge of the loader. The loader discharge discharges the log from the loader bucket to the downstream section of the processing line.

24 Claims, 13 Drawing Sheets

(56) References Cited

U.S. PATENT DOCUMENTS

| | | | |
|---|---|---|---|
| 6,053,304 A * | 4/2000 | Biagiotti | B65G 47/5122 |
| | | | 198/794 |
| 6,840,368 B2 | 1/2005 | Betti et al. | |
| 9,132,962 B2 | 9/2015 | Cicalini et al. | |
| 2002/0117030 A1 | 8/2002 | Gambaro et al. | |
| 2004/0231959 A1* | 11/2004 | Betti | B65G 47/5122 |
| | | | 198/347.1 |
| 2012/0308348 A1 | 12/2012 | Gelli et al. | |
| 2013/0333183 A1 | 12/2013 | Mazzaccherini et al. | |
| 2017/0073160 A1* | 3/2017 | Perini | B65G 17/12 |

\* cited by examiner

ACCUMULATOR FOR PROCESSING LINE AND METHOD OF USING SAME

RELATED APPLICATION DATA

This application claims the benefit of U.S. provisional application Ser. No. 62/887,723, filed Aug. 16, 2019, the disclosure of which is incorporated by reference herein.

BACKGROUND AND SUMMARY

This disclosure is directed to an accumulator for a processing line. More in particular, the accumulator is configured to transfer logs of convolutely wound web material between upstream and downstream sections of a processing line. The processing line may include a winding machine for winding the web material into logs upstream of the accumulator, and a saw for cutting logs into rolls for consumer end use downstream of the accumulator. Accordingly, in one configuration, the accumulator allows for receiving logs from the winding equipment, then storing the logs, and then transferring the logs in a desired timing and sequence as needed by the saw operations. In another configuration, the accumulator may be used to receive, store and timely deliver the logs to other equipment.

More in particular, the disclosure is directed to an accumulator with a loader and transfer conveyor. The transfer conveyor is adapted and configured to transfer a log from the main accumulator to the loader one log at a time which assists in maintaining the quality of the log. Further, the loader is adapted and configured to deliver the log to downstream processing equipment in a more direct manner that also assists in maintaining the quality of the log.

DETAILED DESCRIPTION

Figure 1:
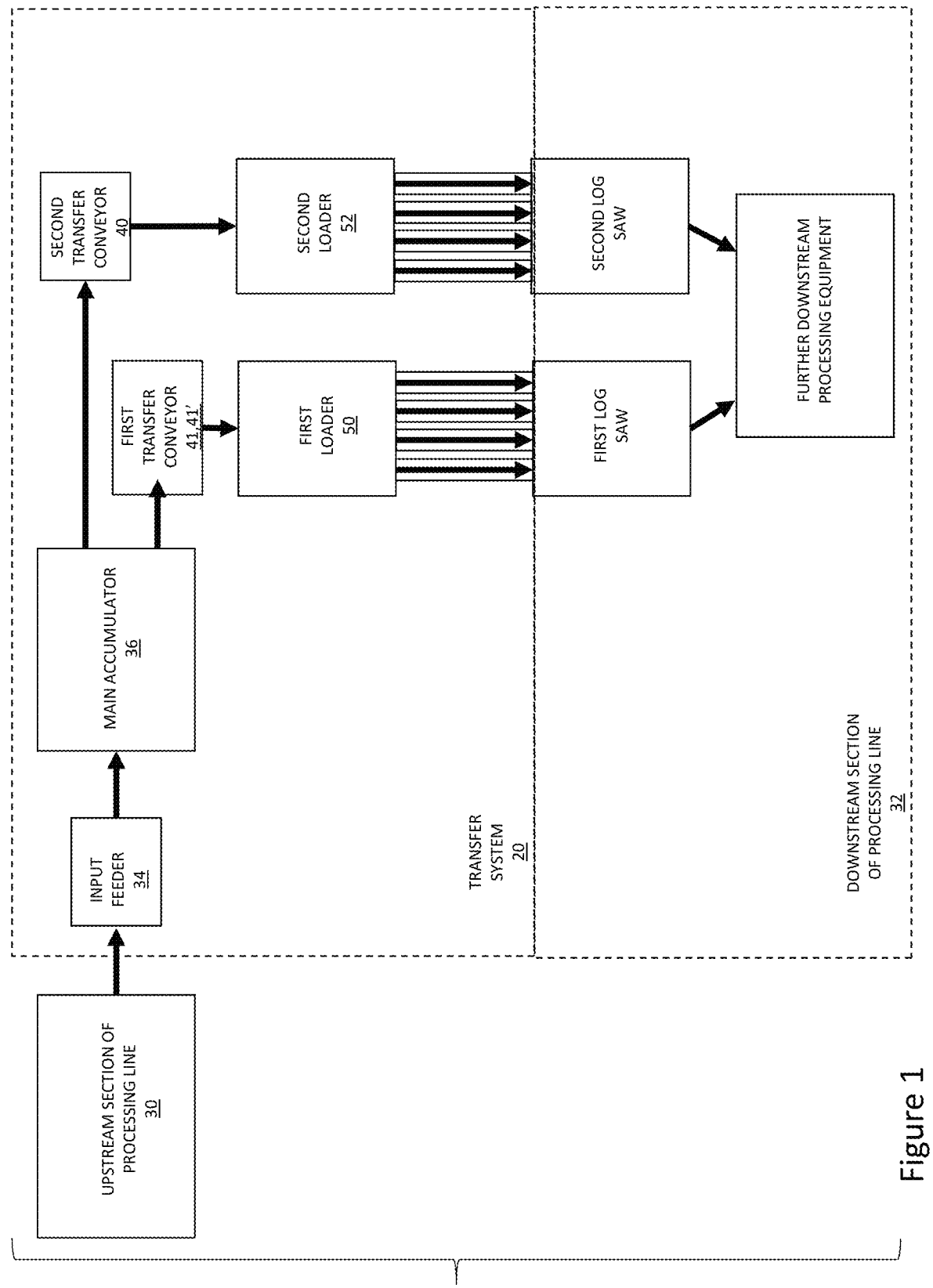
FIG. 1 is a process flow diagram showing one embodiment of a log processing line transfer system.
Figure 2:
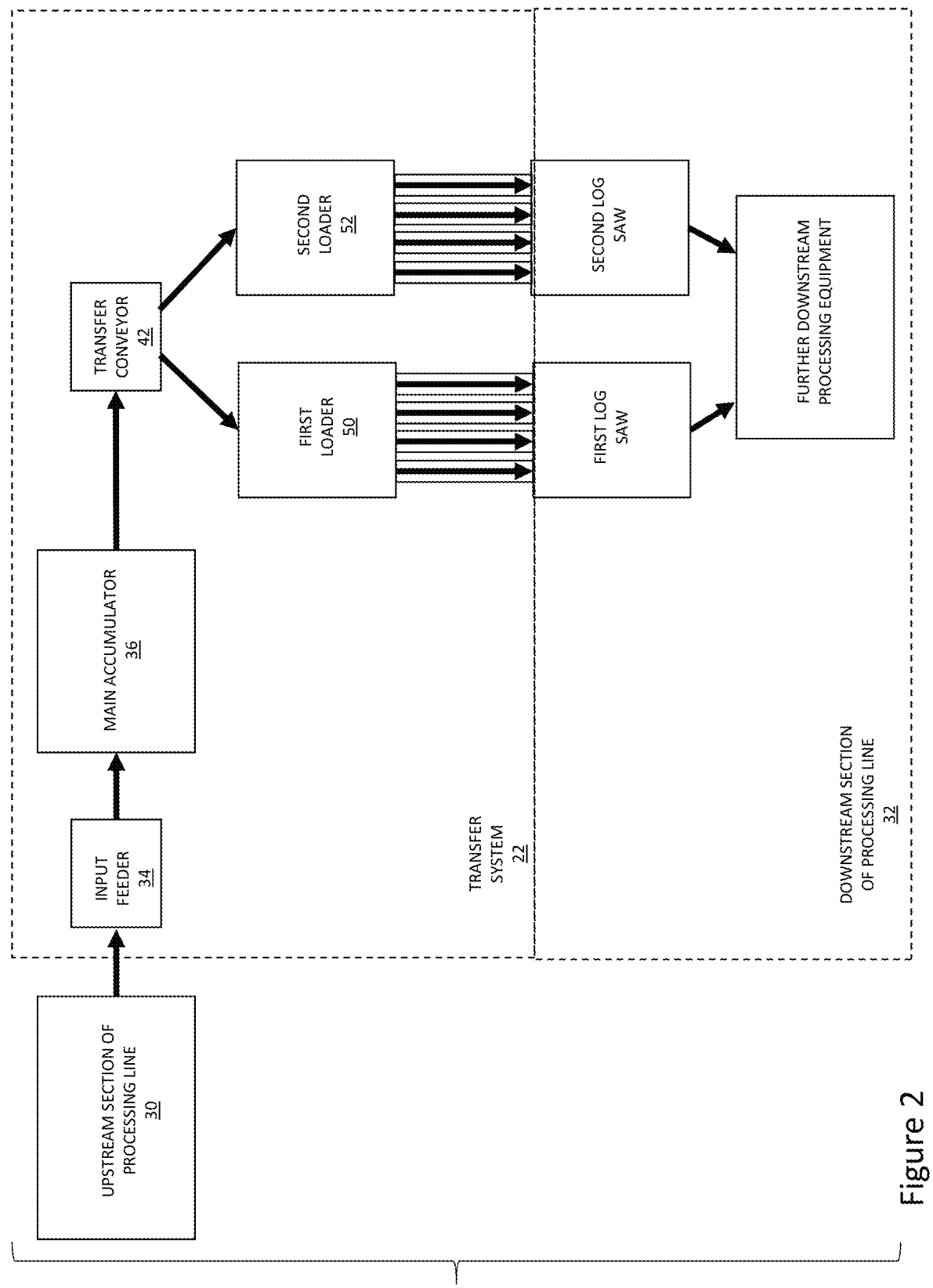
FIG. 2 is a process flow diagram showing another embodiment of a log processing line transfer system.
Figure 3:
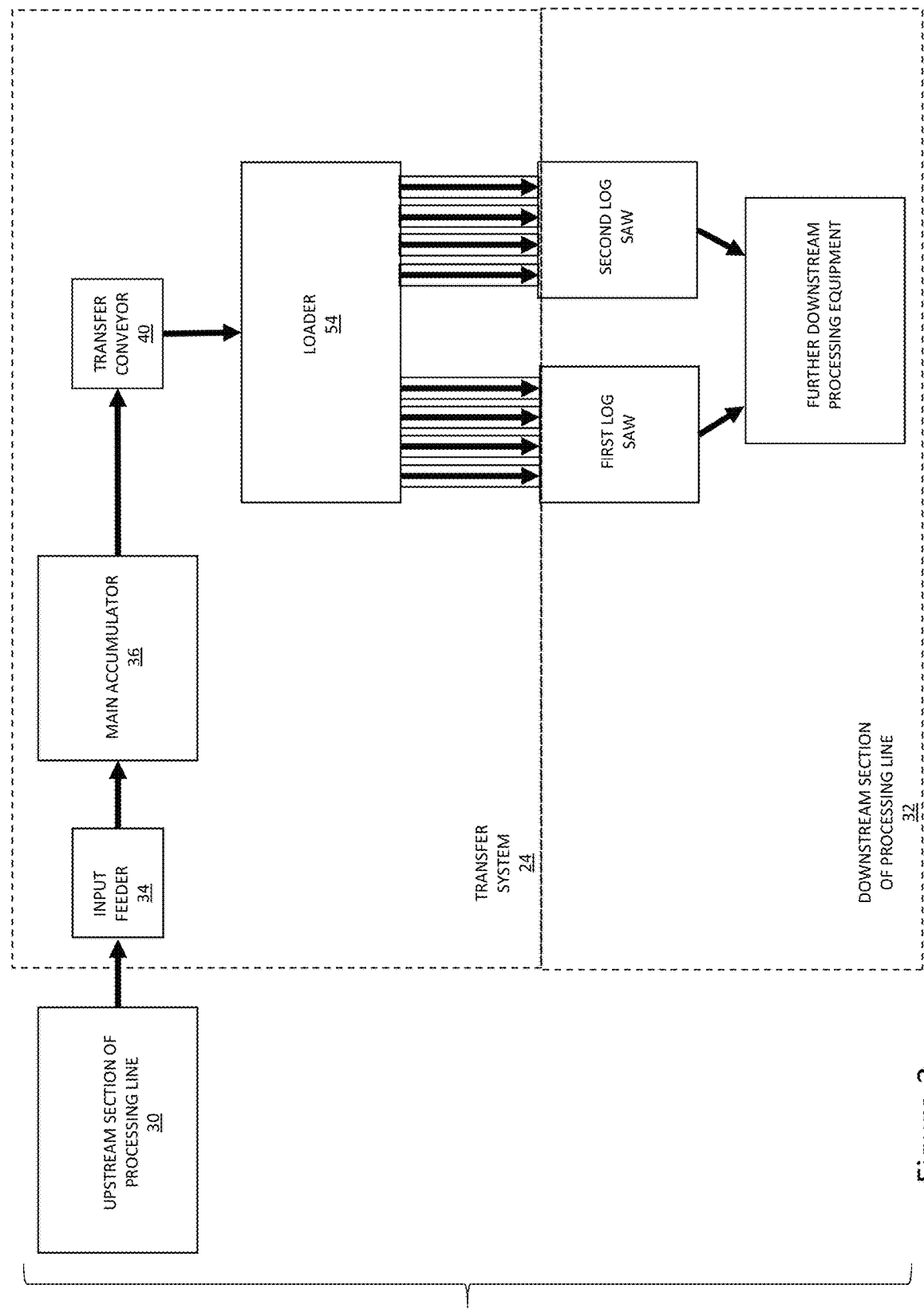
FIG. 3 is a process flow diagram showing another embodiment of a log processing line transfer system.
Figure 4:
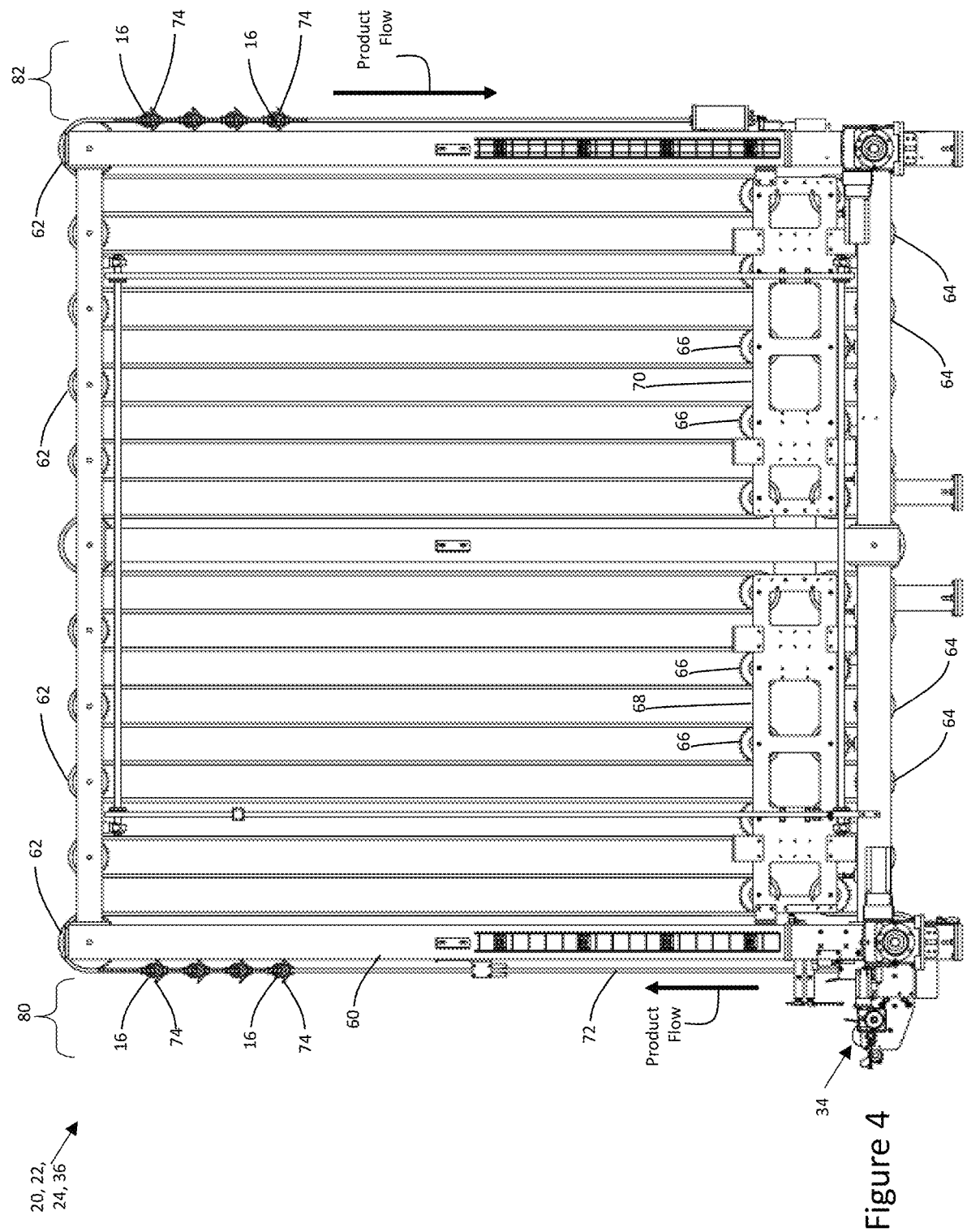
FIG. 4 is a front elevational view of an exemplary accumulator of the processing line transfer systems of FIGS. 1-3.

FIGS. 1-3 show an overview of processing lines 10,12,14 and the transfer systems 20,22,24 described herein. The processing lines 10,12,14 process logs 16 of convolutely wound web material and the transfer systems 20,22,24 transfer the logs from upstream processing equipment 30 to downstream processing equipment 32. For instance, the processing line may include an unwinder that transfers web material from a parent roll to a rewinder that converts the web material into logs. The processing line may include a saw cutting operation that converts the logs into rolls for consumer end use. The processing line may further include a packaging line for packaging the rolls for consumer sale. The transfer system 20,22,24 may be disposed at any point in the line where there is a need to queue logs for further processing. In that regard, the transfer system 20,22,24 receives logs from upstream processing equipment 30, temporarily stores the logs, and then delivers logs to downstream processing equipment 32, as needed. The transfer system 20,22,24 may include an input feeder 34 which receives the logs from the upstream processing equipment 30 and loads the logs to a main accumulator 36, for instance, as shown in FIG. 4. The input feeder 34 is conventional. For example and not in any limiting sense, the input feeder may be a table that a log rolls down. The input feeder may be a table, with driven belts positioned above the table; the driven belts assist in moving a log along the table. The input feeder may be a paddle device similar to that shown in FIG. 5. The main accumulator 36 is adapted and configured to store the logs. The main accumulator 36 is conventional, and by way of example and not in any limiting sense, the accumulator may be of the type shown in U.S. Pat. Nos. 4,142,626, 4,168,776, and/or 6,053,304, the disclosures of which are incorporated by reference herein.

Figure 5:
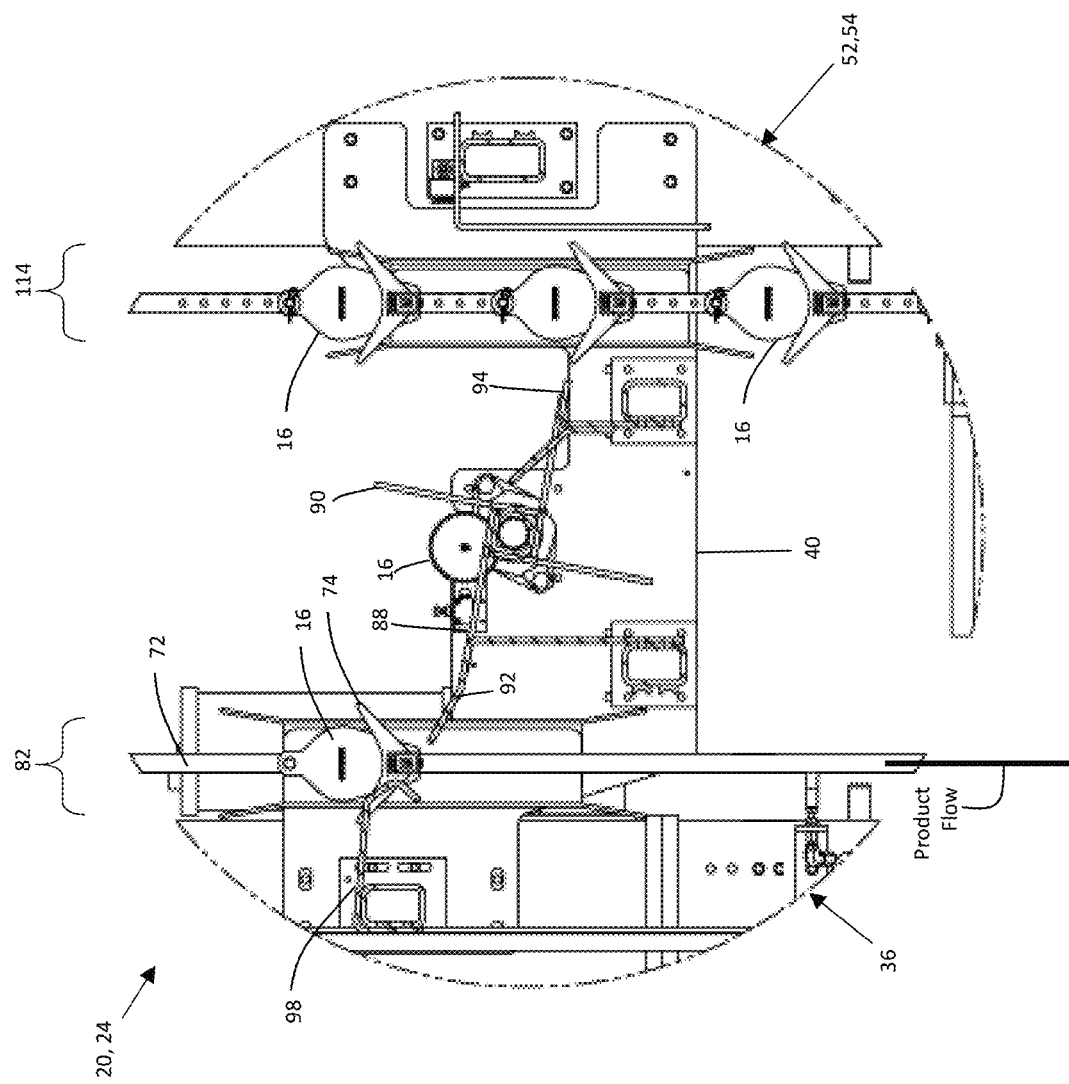
FIG. 5 is a partial, front elevational view of an exemplary transfer conveyor of the processing line transfer systems of FIGS. 1 and 3.
Figure 8:
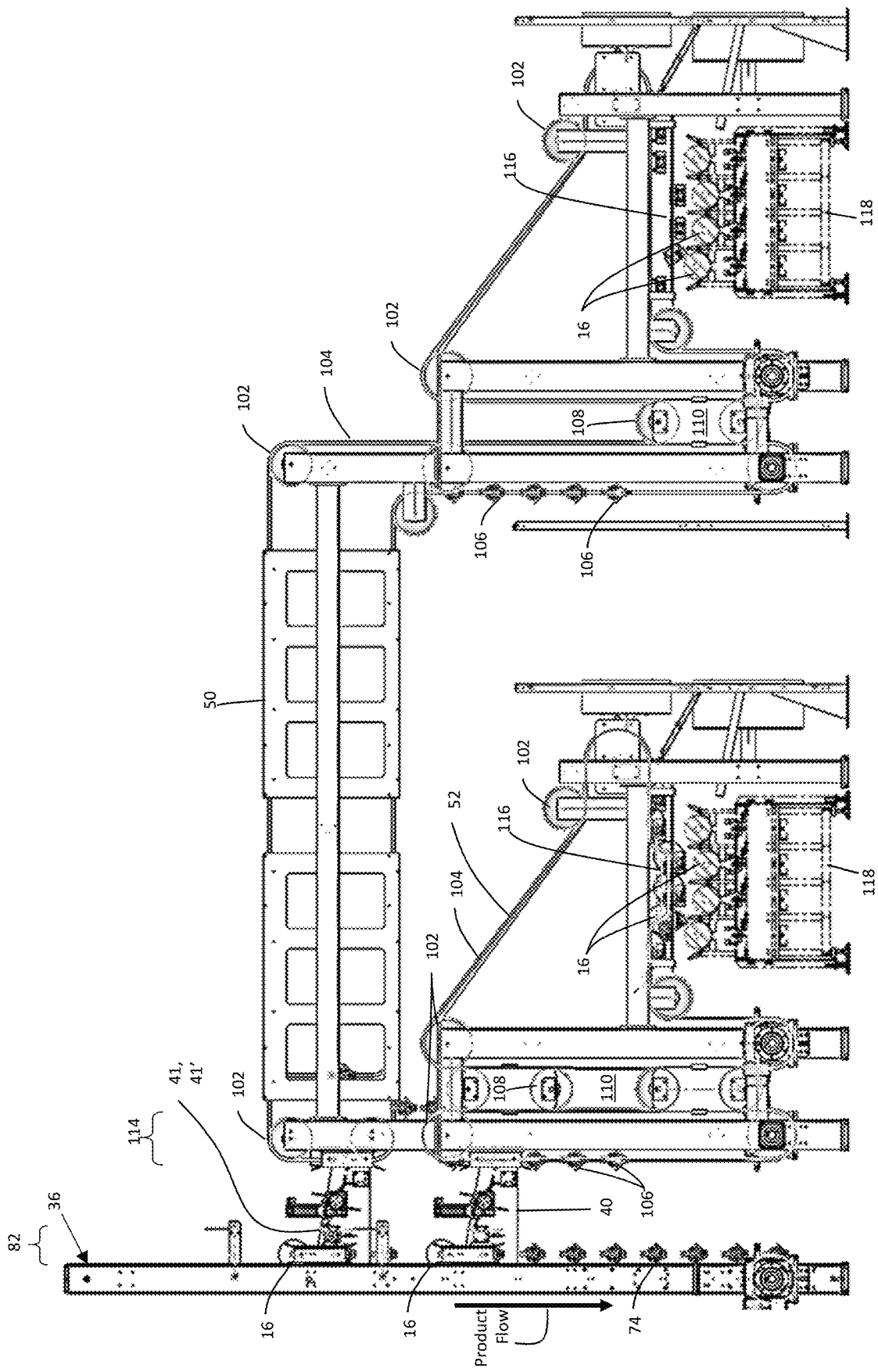
FIG. 8 is a front elevational view showing a portion of the processing line of FIG. 1 with first and second loaders adjacent the accumulator of FIG. 4, first and second transfer conveyors of the type shown in FIGS. 5-6 extending between the exit side of the accumulator of FIG. 1 and the first and second loaders, and four log saw conveyor lanes under each loader.
Figure 9:
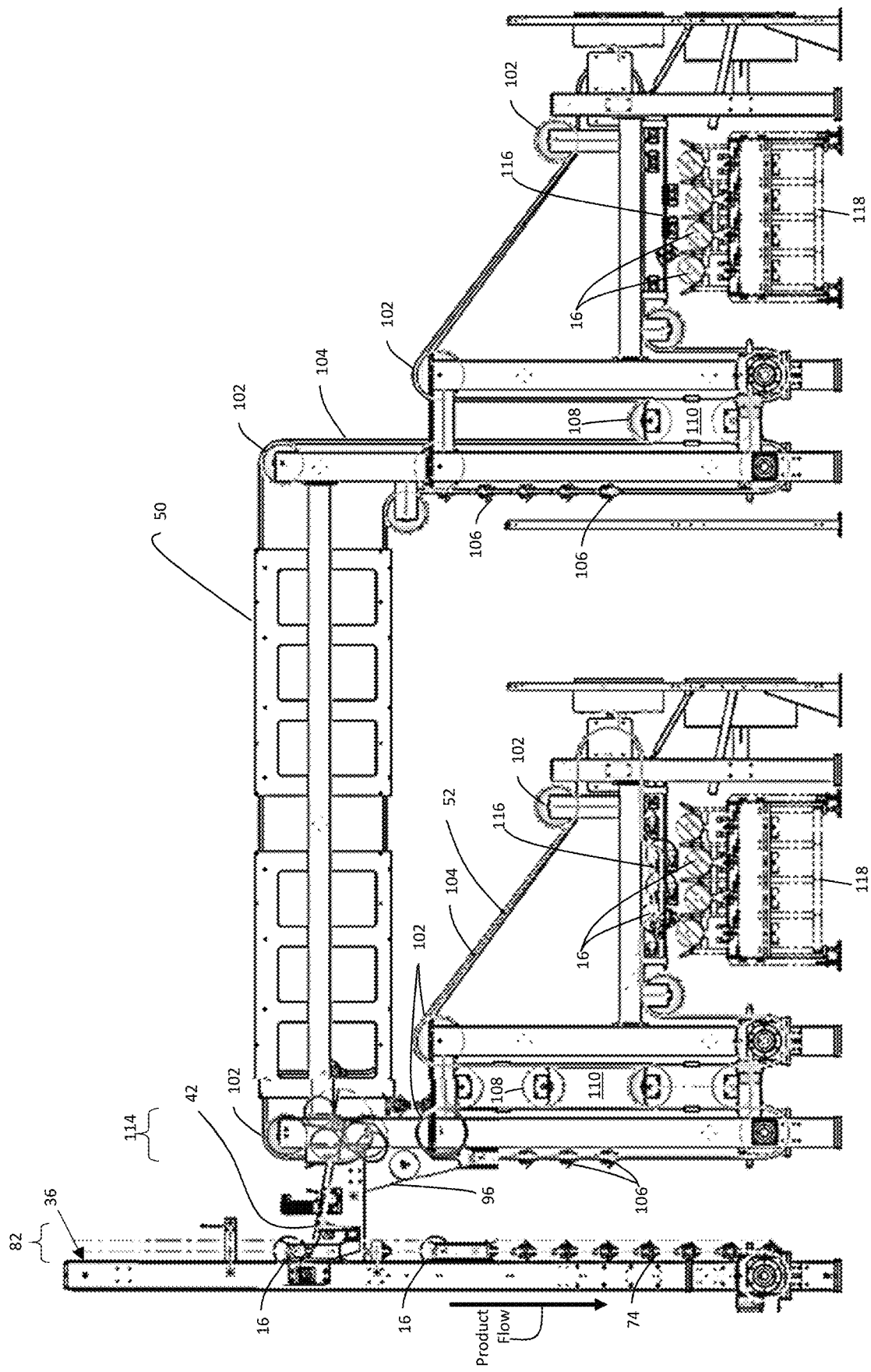
FIG. 9 is a front elevational view showing a portion of the processing line of FIG. 2 with first and second loaders adjacent the accumulator of FIG. 4, a single transfer conveyor of the type shown in FIG. 6A and/or FIG. 6B and/or FIG. 7 extending between the exit side of the accumulator of FIG. 1 and the first and second loaders, and four log saw conveyor lanes under each loader.
Figure 10:
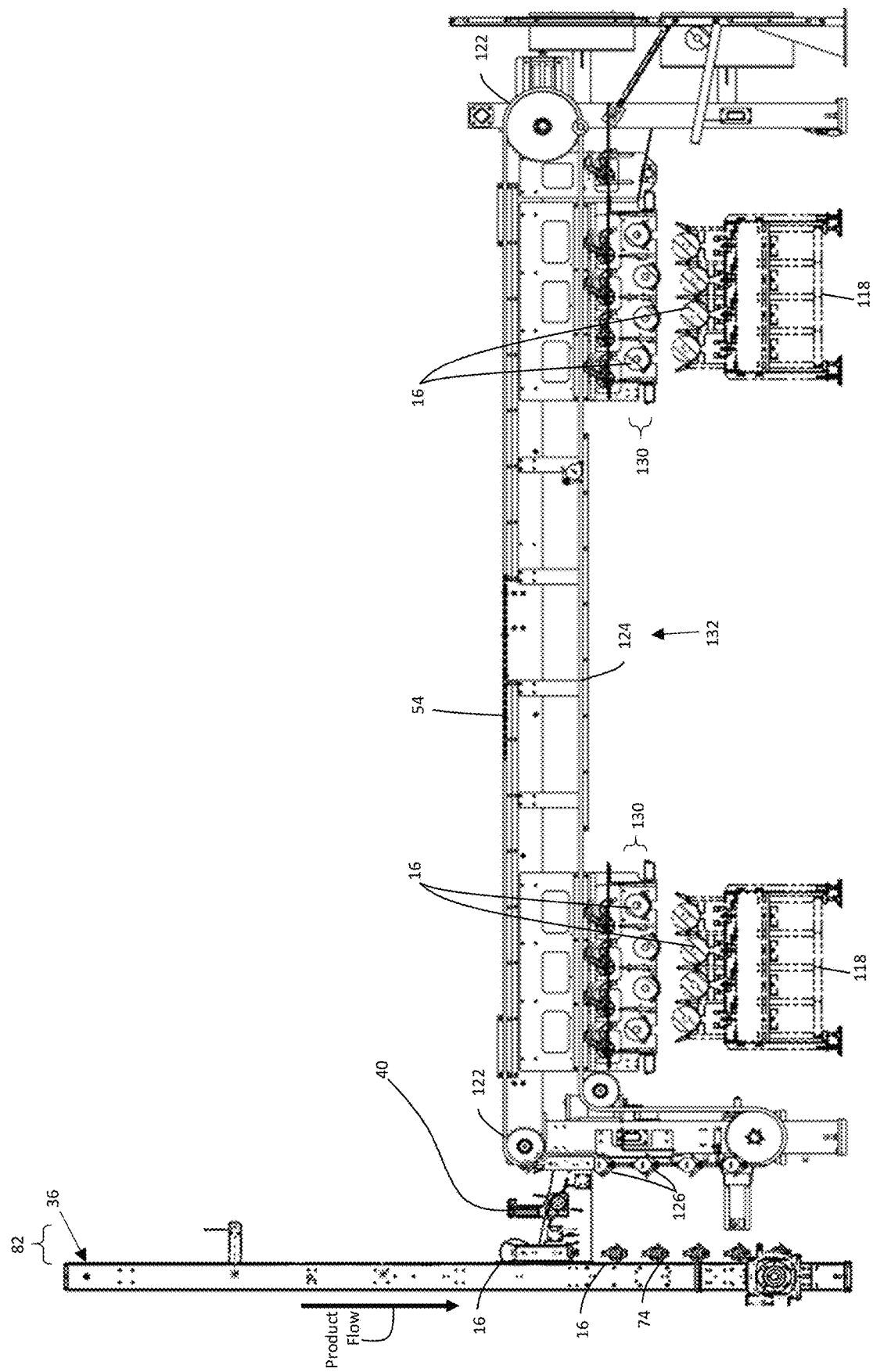
FIG. 10 is a front elevational view showing a portion of the processing line of FIG. 3 with a single loader adjacent the accumulator of FIG. 4, a single transfer conveyor of the type shown in FIG. 5 extending between the exit side of the accumulator of FIG. 1 and the loader, and four log saw conveyor lanes in each of two locations under the loader.
Figure 12:
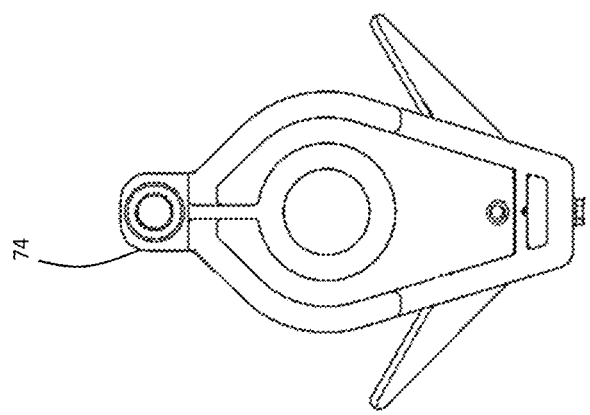
FIG. 12 is a front view of the main accumulator bucket of FIG. 11.

As further described below, the transfer system 20,22,24 may include one or more transfer conveyors 40,42. The transfer conveyor may be a paddle style rotary conveyor as shown in FIG. 5 and FIG. 12 ('40'), FIG. 6A ('41'), 6B ('41') and FIG. 13 ('41'), and FIG. 7 ('42'). By way of example and not in any limiting sense, the transfer conveyor may be a belt driven conveyor, a robotic arm conveyor, a paddle pusher style conveyor, or other similar device configured to achieve conveyance of the log from the main accumulator to the loader. For illustrative purposes only, in the examples described herein, the transfer conveyor 40,41, 41',42 is a paddle style conveyor that is adapted and configured to transfer the log from the main accumulator to a loader 50,52,54. The loader 50,52,54 is adapted and configured to transfer the log to the downstream processing equipment 32. FIGS. 8-9 show two loaders 50,52. FIG. 10 shows one loader 54. One or more loaders may be provided.

FIGS. 1-3 provide a non-limiting example of a process flow for the processing lines 10,12,14. As shown in FIG. 1, two transfer conveyors 40,41,41' and two loaders 50,52 are provided. The transfer conveyors 40,41,41' work together with a dedicated loader 50,52 to deliver logs to the downstream processing equipment 32. When logs are being transferred from the main accumulator to both of the loaders 50,52, the transfer conveyors 40,41,41' transfer logs from the main accumulator to the loaders on a one-to-one basis, which may be simultaneous if the distance between the transfer conveyors is equal to an integer multiple of the distance between buckets in the main accumulator. When logs are being transferred to only one loader, for example when the log saw connected to that loader is operational but the log saw connected to another loader is not operational, one transfer conveyor works independently of the other to transfer logs from the main accumulator to a loader. In FIG. 2, a single transfer conveyor 42 is provided. The single transfer conveyor is configured to deliver logs to either the first loader 50 or the second loader 52, as needed. The transfer conveyor 42 may selectively deliver the logs to the first or second loader 50,52. In the alternative, the transfer conveyor 42 may alternatingly deliver the logs to the first and second loader 50,52. In one configuration, the transfer conveyor 42 moves in a first direction (for instance, a first rotary direction) to transfer the logs from the main accumulator 36 to the first loader 50, and in a second direction opposite the first direction to transfer the logs from the main accumulator 36 to the second loader 52. In FIG. 3, a single transfer conveyor 40 transfers the logs to a single loader 54. The loader 54 is adapted and configured to selectively transfer the logs to the downstream processing equipment 32.

Figure 11:
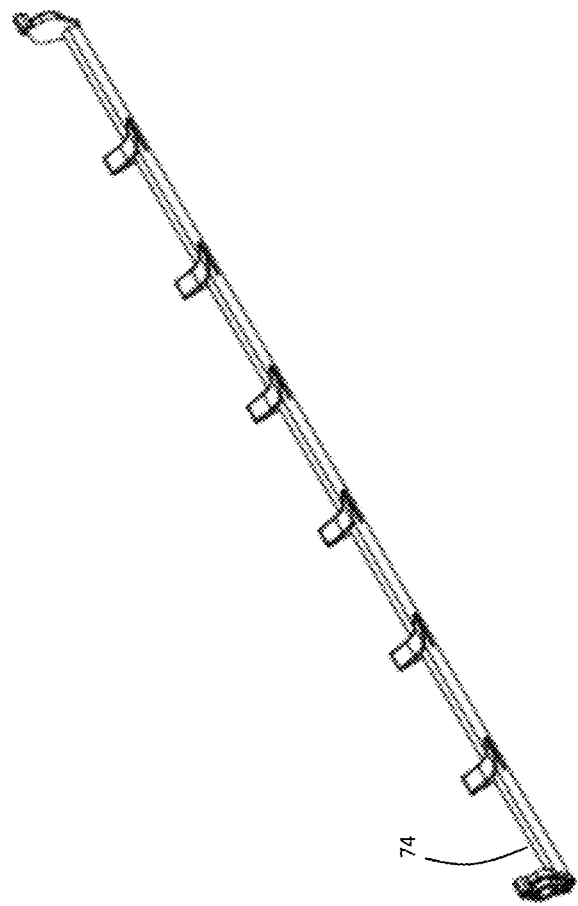
FIG. 11 is a perspective view of an exemplary main accumulator bucket or tray.

Referring to FIG. 4, the accumulator 36 has a frame 60, and top guide wheels 62 are arranged adjacent a top member of the frame and bottom guide wheels 64 are arranged adjacent to a bottom member of the frame. Intermediate guide wheels 66 are provided on first and second carriages 68,70 that are vertically movable between uprights of the frame 60 between the top and bottom members of the frame. In the alternative, a single carriage may be provided. An endless loop 72 extends around the guide wheels. The endless loop has a plurality of main accumulator buckets 74 with a generally v-shaped cross-section for supporting the logs 16 as they are received from the input feeder 34 and conveyed through the main accumulator 36 to the transfer conveyor(s) 40,41,41',42. The generally v-shaped cross-section of the bucket for supporting the logs may have the form of fingers intermittently spaced along an axis of the bucket as shown in FIGS. 11-12. In the drawing, only some of the buckets are shown for ease of illustration. The main accumulator buckets 74 may be evenly spaced along the endless loop 72. The main accumulator buckets 74 are pivotally connected to the endless loop 72 so as to allow the logs 16 to be conveyed in the accumulator around the guide wheels 62,64,66 and to allow the buckets to pivot as necessary to receive a log from the input feeder 34 and to transfer a log to the transfer conveyor(s) 40,41,41',42.

On an input zone 80 of the main accumulator, the input feeder 34 may be provided. The input feeder 34 is adapted and configured to receive a log 16 from the upstream processing equipment 30 and transfer the log to one of the main accumulator buckets 74. For instance, the input feeder 34 may be configured to rotate to allow a log 16 to roll into a transport vane of the input feeder, and through continued rotation of the transport vane, to allow the log to roll out of the transport vane to a main accumulator bucket 74. The input feeder 34 may pause in its rotation, for example, at an angle of about 20-30 degrees, so that a further log 16 would stop against an edge of the transport vane of the input feeder, thus preventing more than one log from rolling into the transport vane. The input feeder pausing in its rotation in this manner helps to compensate for a varying rate of logs arriving from the upstream processing equipment 30. The main accumulator bucket 74 may be stationary as it receives a log from the transport vane of the input feeder, the main accumulator bucket 74 may be in motion along the path of the endless loop as it receives a log from the transport vane of the input feeder, or the main accumulator bucket 74 may be configured to pivot relative to the endless loop 72 as the bucket passes adjacent the input feeder 34 to allow the bucket to receive the log from the transport vane of the input feeder. The endless loop 72 may then convey the log 16 in the main accumulator bucket 74 upwards and through the accumulator to the transfer conveyor(s) 40,41,41',42. The input feeder 34 may be configured to sense the passage of the main accumulator bucket 74 and to initiate the transfer of the log from the input feeder to the main accumulator bucket with a seamless transition. The speed of rotation of the input feeder 34 and/or the speed of the endless loop 72 may be controlled as needed to enable the transfer of the log from the input feeder to the main accumulator bucket 74 with a seamless transition.

The logs 16 disposed in the main accumulator buckets 74 may be conveyed from the input zone 80 of the main accumulator to an output zone 82 of the main accumulator. The rate of conveyance may be controlled to maintain a sufficient number of logs in queue in the accumulator while delivering the logs to downstream processing equipment 32 at an acceptable rate. The first and second carriage 68,70 may be adjusted as necessary to maintain the rate of storage and delivery of logs to the downstream processing equipment. For instance, when the rate of logs arriving to the input zone 80 of the main accumulator is greater than the rate of logs leaving from the output zone 82 of the main accumulator, one or both of the carriages 68,70 may be raised, thereby increasing the number of full buckets and reducing the number of empty buckets. The opposite occurs when the rate of logs leaving the output zone 82 increases in relation to the rate of logs arriving to the input zone 80. A distance sensor, for example a laser, may be provided to detect an absolute height position of the carriage, which can be used to calculate the percentage full of the accumulator.

At the output zone 82, the transfer conveyor(s) 40,41,41', 42 may be provided. The transfer conveyor 40,41,41',42 may a rotary paddle style conveyor as shown in FIGS. 5.7 and 13-14. The transfer conveyor may be motor driven and include one or more transfer vanes 88,90 that move with the main accumulator endless loop 72 and main accumulator bucket 74 to transfer the log 16 from the main accumulator bucket to the loader 50,52,54.

Figure 13:
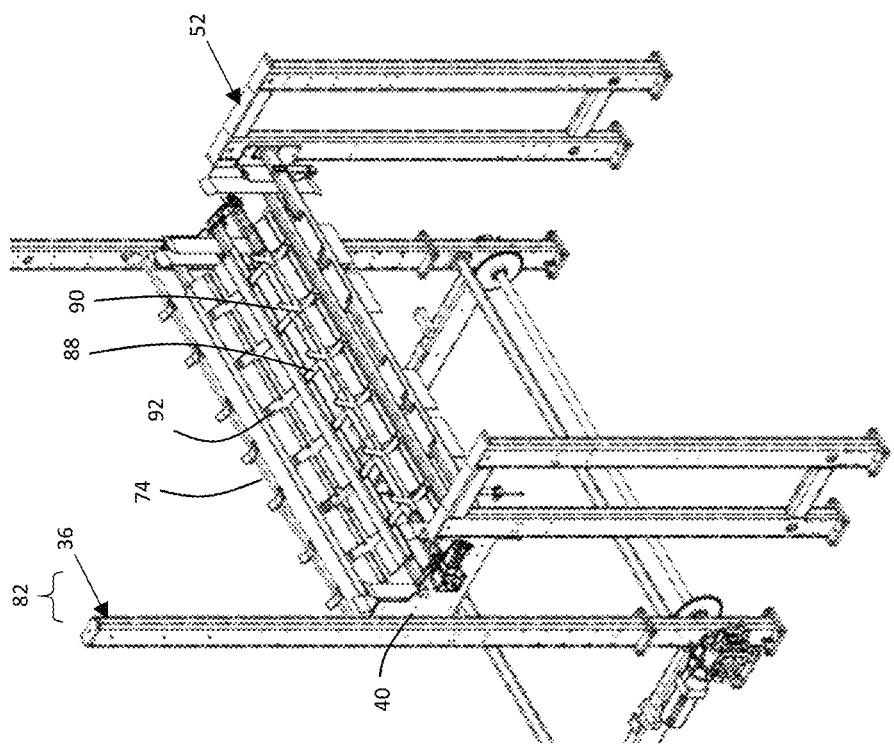
FIG. 13 is a perspective view of the transfer conveyor of FIG. 5 with ramp portions fixed in place to strip logs from an accumulator bucket as the bucket advances past the transfer conveyor.

In one example as shown in FIGS. 5 and 13, the transfer conveyor 40 is coupled to a specific loader 52,54 (e.g., as shown by example in FIGS. 1, 3, 8, 10). The transfer conveyor 40 is configured to allow the log to roll out of the main accumulator bucket 74 along a first transfer vane 88 to a second transfer vane 90 that functions as a stop, and upon rotation of the paddle of the transfer conveyor (clockwise in FIG. 5), the transfer conveyor is configured to allow the log to roll along the second portion of the transfer vane to the loader 52,54. The transfer conveyor 40 may include a ramp portion 92 to transition from the main accumulator to the transfer vane 88,90 and a ramp portion 94 from the transfer vane to the loader. The main accumulator 36 may also have a ramp portion 98 that cooperates with the main accumulator bucket 74 to allow the log to be removed from the bucket to the transfer paddle 40. As best shown in FIG. 13, the ramp portion 92 (and ramp portions 94,98 not shown in FIG. 13) may interdigitate with fingers of the main accumulator bucket 74 so as to remove a log from the bucket as the bucket advances past the ramp portions. The ramp portions 92,94,98 may be fixed in place so that a log is stripped from every bucket that advances past the ramp portions. The main accumulator bucket 74 may also be caused to pivot to release a log from the bucket to the transfer conveyor 40.

Figure 6A:
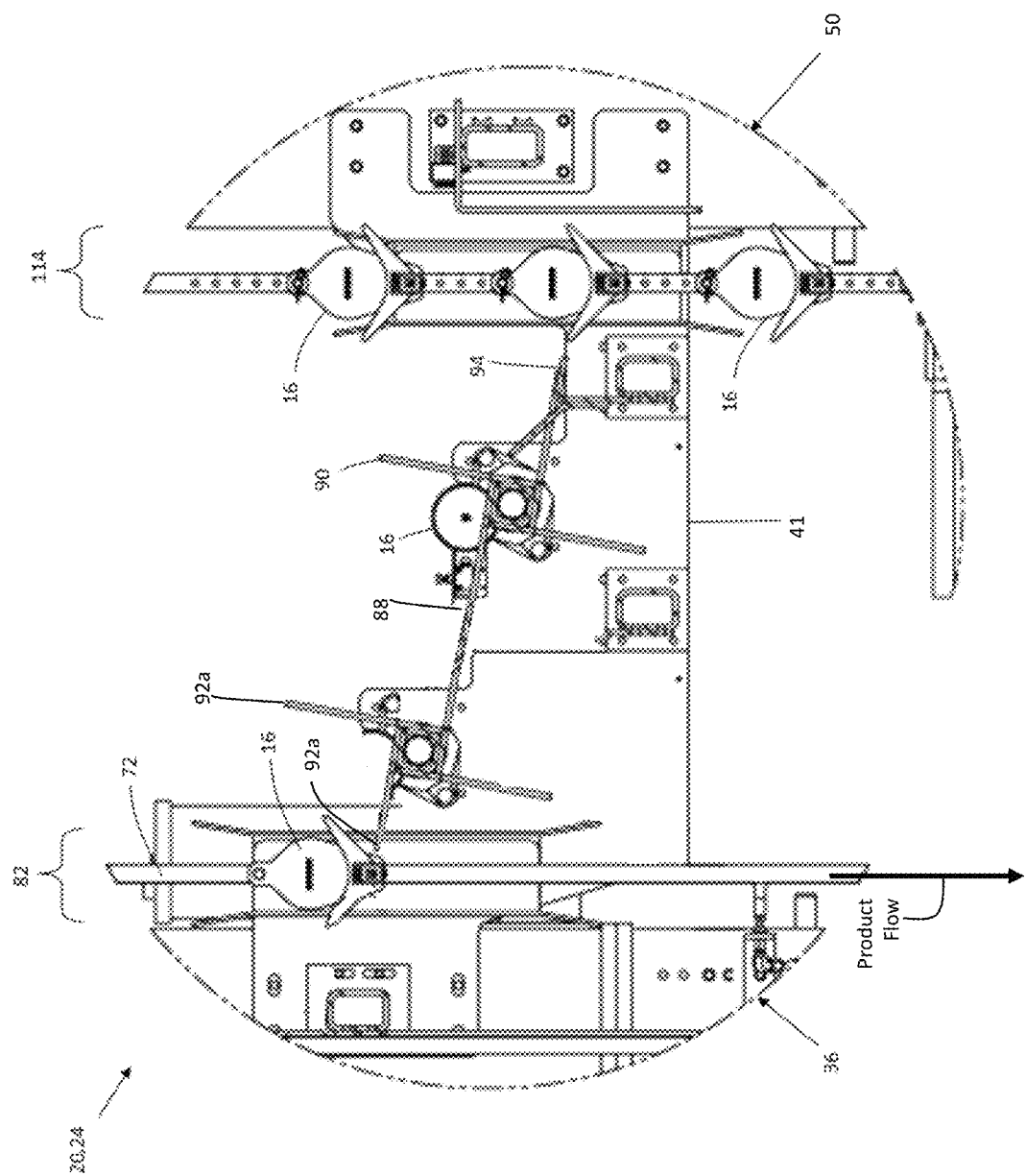
FIG. 6A is a partial, front elevational view of another exemplary transfer conveyor of the processing line transfer system of FIG. 1.
Figure 6B:
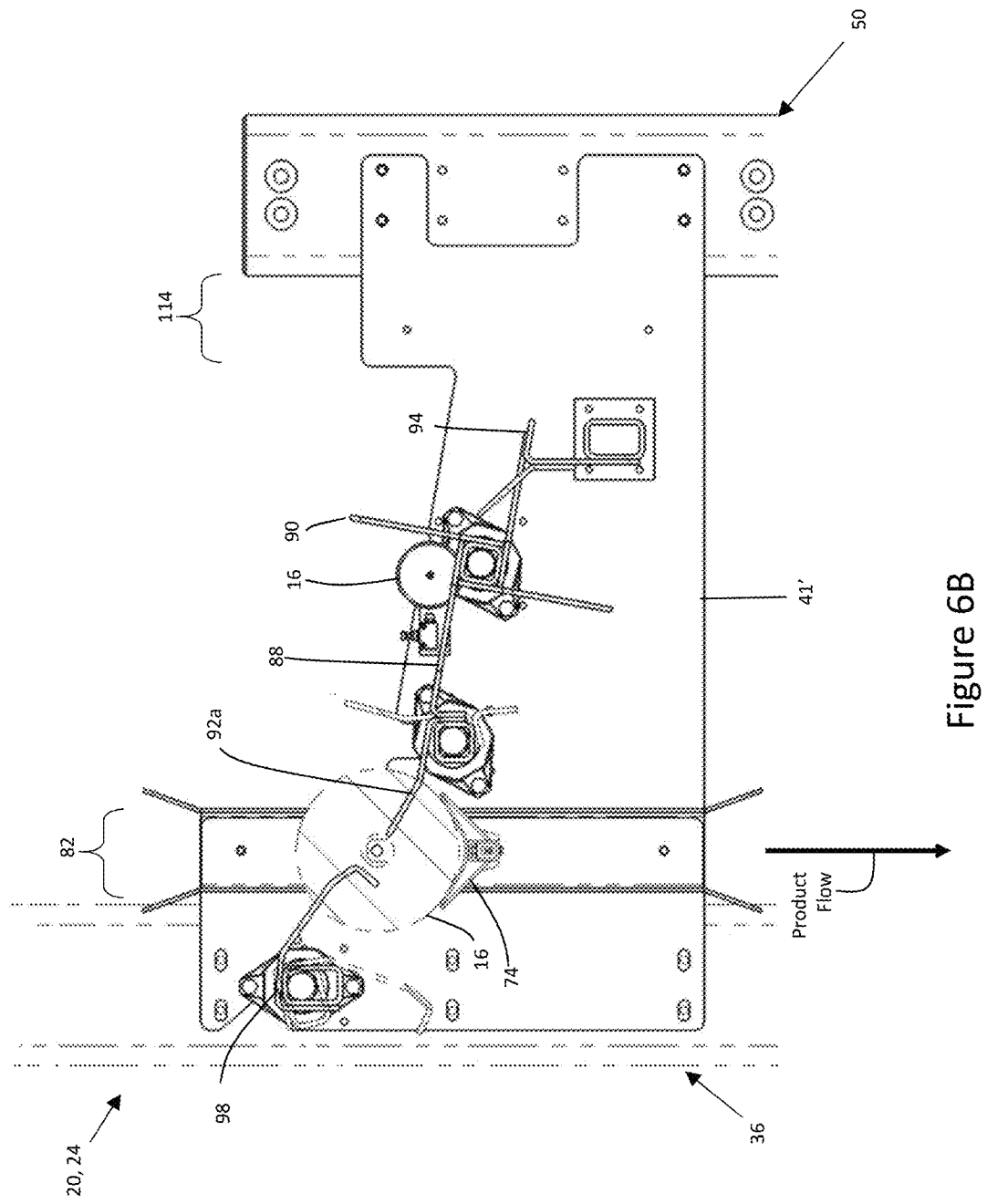
FIG. 6B is a partial, front elevational view of another exemplary transfer conveyor of the processing line transfer system of FIG. 1
Figure 14:
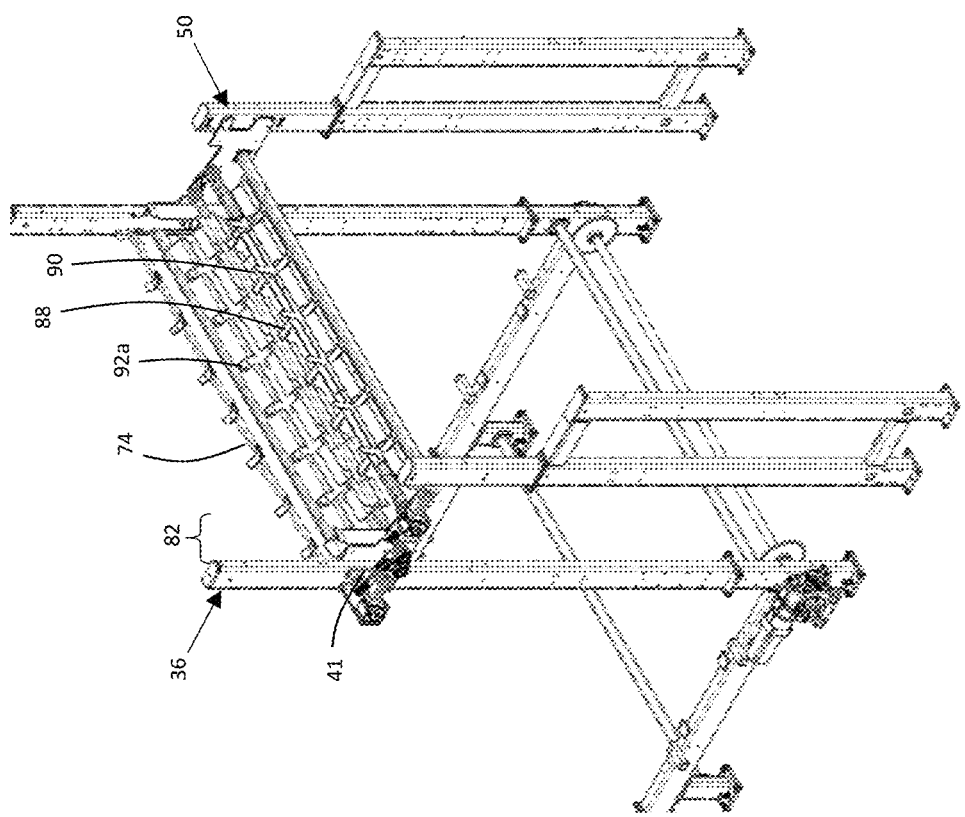
FIG. 14 is a perspective view of the transfer conveyor of FIG. 6A and/or FIG. 6B with ramp portions that are rotatably mounted to the transfer conveyor to strip logs from an accumulator bucket or to allow the logs to remain in the accumulator bucket as the bucket advances past the transfer conveyor.

In the alternative or in addition, the ramp portions may be adapted and configured to allow some logs to remain in the accumulator buckets and to strip other logs from the accumulator buckets as the buckets advance past the ramp portions, for example, by pivoting or sliding the ramp portions to a first position in which logs remain in the main accumulator bucket 74, and to a second position in which logs are stripped from the main accumulator bucket. In an example as shown in FIGS. 6A,6B and 14, the transfer conveyor 41,41' has ramp portions 92a that are rotatable. In one configuration, the ramp portions 92a may rotate to a position generally transverse to the path of the main accumulator bucket 70 so that the ramp portions may strip the log from the main accumulator bucket to the transfer conveyor 41,41' for delivery to the loader 50. In a second configuration, the ramp portions 92a may rotate to a position generally away from the path of the main accumulator bucket so that the ramp portions do not interfere with the log from the main accumulator bucket and allow it pass to the transfer conveyor 40 for delivery to the second loader 52. In the alternative, or in addition to, the main accumulator bucket 74 may also be caused to pivot to release a log from the bucket to the transfer conveyor 41,41'. In FIG. 68, the ramp portions 92 and 98 are also rotatable in one position to assist in delivering the log to the first loader 50 and rotatable to another position to allow the log to pass to the transfer conveyor 40 for delivery to the second loader 52.

Figure 7:
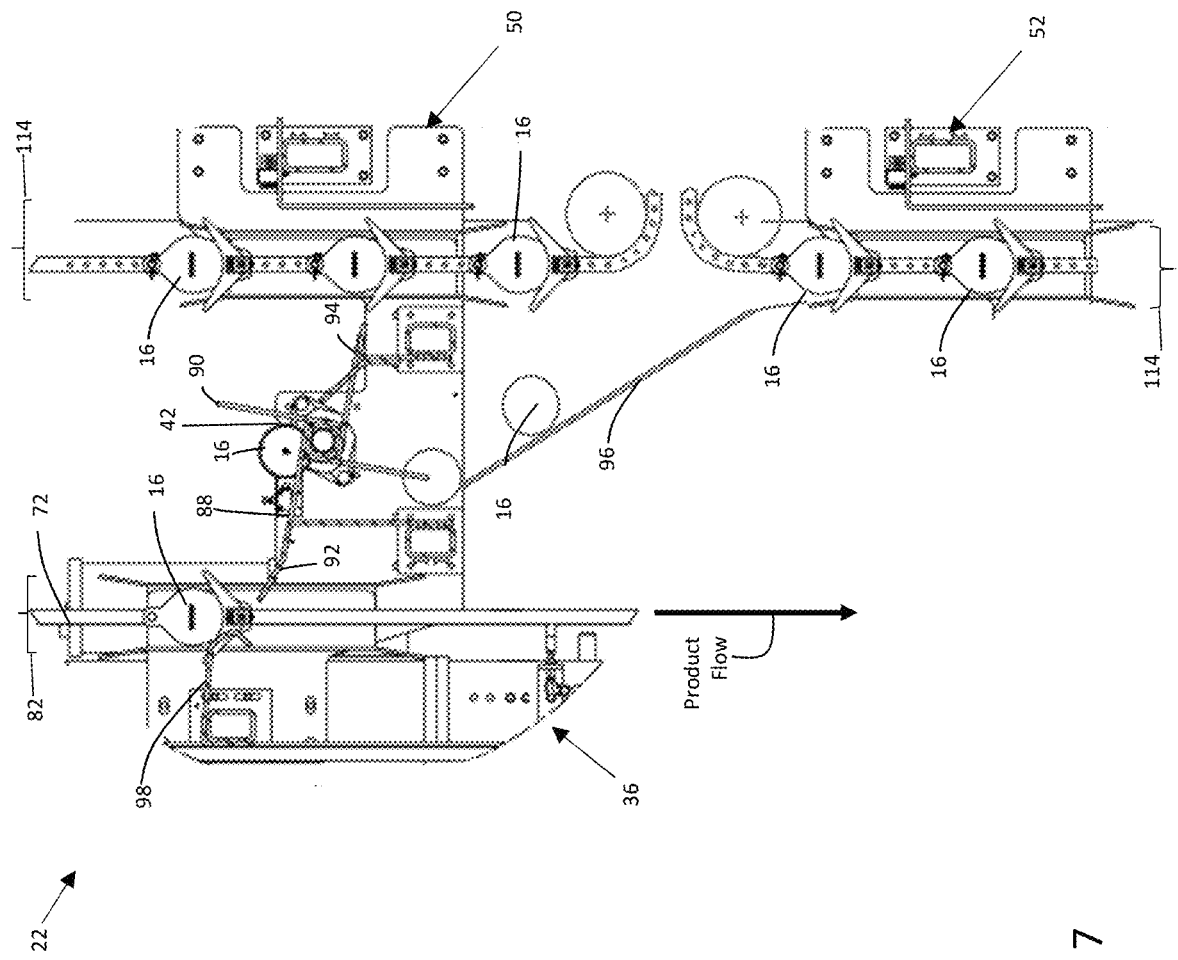
FIG. 7 is a partial, front elevational view of an exemplary transfer conveyor of the processing line transfer systems of FIG. 2.

In a further example, as shown in FIGS. 2, 7, and 9, the transfer conveyor 42 is coupled to two loaders. The transfer paddle 42 may be configured to operate in two directions. The first direction may be as described above relative to the transfer paddle 40 in FIG. 5 (with clockwise rotation) which directs the log to the first loader 50. The second direction may include allowing the log 16 to roll out of the main accumulator bucket 74 along a first transfer vane 88 to a second transfer vane 90 that function as a stop, and upon rotation of the transfer paddle (counter-clockwise in FIG. 7), the transfer paddle is configured to allow the log to roll back on the first transfer vane 88 to a chute 96 which directs the log to the second loader 52. The chute may contain a conveyor to control the motion of the log along the chute during delivery from the transfer paddle 42 to the second loader 52.

In the described configurations with either one or two transfer conveyors 40,41,41',42, as the main accumulator bucket 74 passes adjacent to the transfer paddle, ramp portions 92,94,98 may release the log 16 (e.g., vis-b-vis stripping and/or pivoting) from the main accumulator bucket to the first transfer vane 88 of the transfer paddle. The transfer conveyor 40,42 may be configured to sense the presence of a log at the second transfer vane 90 and to rotate and initiate the transfer of the log from the main accumulator bucket to the transfer conveyor with a seamless transition. The speed of rotation of the transfer conveyor 40,41,41',42 and/or the speed of the endless loop 72 may be controlled as needed to enable the transfer of the log from the main accumulator bucket 74 to the transfer conveyor with a seamless transition. The movement of the transfer conveyor 40,41,41',42, the movement of the endless loop 72, and the movement of the input feeder 34 may be independent of each other. The speed of rotation of the transfer conveyor(s) 40,41,41',42 may be controlled to satisfy downstream processing requirements for delivery of logs, and the speed of rotation of the input feeder 34 may be controlled based upon production rates of the upstream section of the processing line. The rate of advancement of the endless loop 72 of the main accumulator may be a function of both downstream processing requirements for delivery of logs and production rates of the upstream section of the processing line.

As shown in the drawings, the transfer conveyor 40,41, 41',42 is disposed between the output zone 82 of the main accumulator and the loader 50,52,54. Depending upon the desired configuration, one or more transfer conveyors may be provided. In FIG. 8, two transfer conveyors 40,41,41' are provided and a loader 50,52 is associated with each transfer paddle. Accordingly, the first transfer conveyor 41,41' may be adapted and configured to receive a log from a main accumulator bucket 74 in the manner described above, and the second transfer conveyor 40 may be adapted and configured to receive another log from another main accumulator bucket 74 in the manner described above. The first transfer conveyor 41,41' may be provided with the ramp portions 92a that are movable between an open position and a closed position, while the second transfer conveyor 40 may be provided with ramp portions 92 that are fixed in place. The system may be configured to allow the first and second transfer paddles 41,41',40 to receive logs on a one-to-one basis from the main accumulator buckets 74 when both loaders have capacity to receive logs. When both loaders 50,52 have capacity to receive logs, actuators associated with the ramp portions 92a,98 of the first transfer paddle 41,41' may move the ramp portions 92a,98 to an open position, allowing the logs that pass by to remain in the main accumulator buckets 74 as the buckets advance past the first transfer conveyor 41,41'. When all of the buckets between the transfer conveyors 41,40,41' contain logs, the actuators associated with the ramp portions 92a,98 of the first transfer conveyor 41,41' move the ramp portions 92a,98 to a closed position, and the accumulator buckets 74 continue to advance until a number of logs equal to the number of logs between the transfer conveyors has been transferred to each loader 50,52. The system may be configured to allow only the first transfer paddle 41,41' to receive logs when only the first loader 50 has capacity to receive logs, and to allow only the second transfer paddle 40 to receive logs when only the second loader 52 has capacity to receive logs. The first loader 50 may receive logs up until the loader carriage 110 reaches a full position. A distance sensor, for example a laser, may be provided to detect an absolute height position of the loader carriage 110, which can be used to calculate the percentage full of the loader accumulator. The second loader 52 may receive logs until the addition of the logs in the buckets between the transfer conveyors 41,40,41' causes the loader carriage 110 to reach its full position. This prevents the system from stopping the feeding of logs to both loaders, which is undesirable, and prevents logs from returning to the accumulator infeed zone, which is undesirable as it creates a risk that the accumulator will attempt to load a log into a bucket which already contains a log.

In the configuration of FIG. 9, one transfer conveyor 42 is provided with the first and second loaders 50,52. The transfer conveyor 42 may be adapted and configured to receive a log from a main accumulator bucket and alternate conveying logs to the first and second loaders 50,52 in the manner described above. The system may be configured to remove a log from a main accumulator bucket by advancing the bucket past stationary ramp portions as described above in connection with FIG. 5. In the alternative, the system may be configured to remove a log from a main accumulator bucket by pivoting the bucket. For instance, the system may be configured to pivot a lead main accumulator bucket toward the transfer conveyor so the transfer conveyor may convey the lead log to transfer to the first loader, and to pivot a subsequent main accumulator bucket (e.g., the next in line after the lead main accumulator bucket) toward the transfer conveyor so the transfer conveyor may transfer the subsequent log to the second loader. In the alternative, the system may be configured to pivot a sequence of main accumulator buckets (one or more in a line) toward the transfer conveyor so the transfer conveyor may convey that series of logs to one of the two loaders and thereafter pivot another sequence of main accumulator buckets (one or more in a line) toward the transfer conveyor so the transfer conveyor may convey that series of logs to the other of the two loaders.

In the configuration of FIG. 10, one transfer conveyor 40 is provided with one loader 54. The transfer conveyor 40 may be configured to receive a log from a main accumulator bucket 74 in the manner described above in connection with FIG. 5, and transfer the log to the loader 54. The system may be configured to pivot a lead main accumulator bucket toward the transfer conveyor to transfer a log to the loader, and to pivot a subsequent main accumulator bucket (e.g., the next in line after the lead main accumulator bucket) toward the transfer paddle to transfer the subsequent log to the loader.

Referring to the embodiment of the loaders 50,52 shown in FIGS. 8-9, each loader may have a plurality of guide wheels 102 about which an endless loop 104 is directed. The loader endless loop 104 may have a plurality of loader buckets 106, which may be evenly spaced along the loader endless loop. The loader buckets 106 may have a generally v-shaped cross-section for supporting the logs as they are received from the transfer paddle 40,42 and conveyed through the loader. The generally v-shaped cross-section of the bucket for supporting the logs may have the form of fingers intermittently spaced along an axis of the bucket as shown in FIG. 11. In the embodiment of the loaders shown in FIGS. 8-9, the loader 50,52 also has intermediate guide wheels 108 that are provided on a loader carriage 110 that is movable within the framework of the loader. In the drawings, only some of the loader buckets are shown for ease of illustration, and on the loader on the left in the drawings, the loader carriage position is shown in phantom in multiple locations within the frame of the loader. The loader buckets 106 may be pivotally connected to the loader endless loop 104 so as to allow the logs 16 to be conveyed from the transfer conveyor 40,41,41' around the guide wheels 102, 108 of the loader and to pivot the loader buckets as needed to transfer the logs from the loader to downstream processing equipment 32.

In FIGS. 8-9, each loader 50,52 has an input zone 114 adjacent to the transfer conveyor 40,42 and a discharge 116. In the examples provided, the discharge 116 is aligned with lanes of a conveyor 118 of a log saw. In particular, the discharge 116 is suspended above the lanes of the conveyor 118 of the log saw. In the alternative, the loader discharge 116 may be aligned with other downstream processing equipment. A loader bucket 106 may pass through the discharge 118 and align with a lane of the conveyor 118 of the log saw. The control system may be configured to enable the loader bucket 106 to pivot sufficiently to allow a log in a loader bucket to drop from the bucket into the lane of the conveyor 118 of the log saw when the bucket is in position above the lane of the log saw. As shown in FIGS. 8-9, four conveyor lanes are provided for the conveyor 118 of the log saw. Four actuators may be positioned laterally across the discharge 116, one for each lane. Each actuator may be configured to pivot the bucket and release the log to a lane of the log saw conveyor 118 as the bucket passes through the discharge and aligns with the desired lane of the log saw. In an example, a bucket may pass through the discharge to position 1, which is aligned with lane 1 of the log saw conveyor. Actuator 1 may be activated to pivot the bucket at position 1 to enable the log to be released from the bucket and to be received in lane 1 of the log saw conveyor. A similar scheme may be used for the remaining lanes. Accordingly, the system may be configured to allow selective placement of logs in a desired lane of the conveyor of the log saw. By way of example, if a log is required for lane 3, the loader endless loop may convey a log in a loader bucket through the loader discharge to position 3 at which point actuator 3 would engage the bucket and cause the log to be released from the bucket into lane 3.

Depending upon downstream requirements for the delivery of logs, the loader carriage 110 may move as necessary to allow a number of logs to be stored in queue within the loader 50,52. This allows greater operational flexibility for matching downstream requirements and further enables the accumulator to be decoupled from the loader to allow better sequencing of the delivery of logs to downstream processing equipment. For instance, when the rate of logs arriving to loader 50,52 is greater than the rate of logs leaving from the loader, the carriage 110 may be raised, thereby increasing the number of full buckets and reducing the number of empty buckets. The opposite occurs when the rate of logs leaving the loader 50,52 increases in relation to the rate of logs arriving to the loader.

In the embodiment of FIG. 10, the loader 54 has a plurality of guide wheels 122 about which an endless loop 124 is directed. The loader endless loop 124 may have a plurality of the loader buckets 126, which may be evenly spaced along the loader endless loop. The loader buckets 126 may have a generally v-shaped cross-section for supporting the logs as they are received from the transfer paddle 40 and conveyed through the loader. The generally v-shaped cross-section of the bucket for supporting the logs may have the form of fingers intermittently spaced along an axis of the bucket as shown in FIG. 11. In FIG. 10, only some of the loader buckets are shown for ease of illustration. The loader buckets 126 may be pivotally connected to the loader endless loop 124 so as to allow the logs to be conveyed from the transfer conveyor 41,41' around the guide wheels 122 of the loader, and to pivot the buckets as needed to transfer the logs from the loader bucket to an accumulation zone 130 disposed between a discharge 132 of the loader 54 and a saw.

In the embodiment of FIG. 10, the loader has multiple accumulation zones 130 that align with conveyors 118 of downstream processing equipment. In particular, in FIG. 10, the loader 54 is provided with first and second accumulation zones 130 that correspond with conveyors 118 of first and second log saws. The discharge 132 of the loader includes actuators for each accumulation zone 130. The actuators are configured to sufficiently pivot a bucket 126 passing through the accumulation zone to allow the log in the loader bucket to drop from the bucket into a desired accumulation zone lane. The logs may then be released from the accumulation zone lane into a lane of the conveyor of the log saw. The release of a log from one accumulation zone lane into a lane of the conveyor of the log saw may be independent of the release of a log from another accumulation zone lane into another lane of another conveyor. As shown in the drawings, four accumulation zone lanes are provided for each accumulation zone 130. Each accumulation zone lane corresponds to a conveyor lane for a log saw. Accordingly, four actuators may be positioned laterally across each accumulation zone 130. Each actuator may be configured to pivot a bucket in a manner sufficient to release the log into a desired accumulation zone lane. The accumulation zone lane may be opened in order to drop the log from the accumulation zone lane into a corresponding lane of the log saw. In one example, a bucket may pass through the discharge to accumulation zone 1 in position 1 which is aligned with accumulation lane 1. Actuator 1 may be activated to pivot the bucket to enable the log to be released from the bucket and to be received in accumulation zone lane 1. Thereafter, the accumulation zone lane 1 may be opened to drop the log from the accumulation zone lane 1 into lane 1 of the logs saw. A similar scheme may be used for filling the remaining lanes in the accumulation zone for each accumulation zone in the discharge. The system may be configured to allow selective placement of a log in a desired lane of a specific accumulation zone and then into a desired lane of a log saw. By way of example, if a log is required for lane 3 of the accumulation zone 1, the loader endless loop may convey a log in a bucket through the loader discharge to position 3 of the accumulation zone 1 at which point actuator 3 would actuate and cause the bucket to pivot and release the log from the bucket into lane 3 of accumulation zone 1. Subsequently, lane 3 of the accumulation zone may be opened to drop the log from lane 3 of the accumulation zone into lane 3 of the log saw conveyor. To the extent the accumulation zone lane is filled, a loader bucket 126 may pass through the accumulation zone 130 and may be re-circulated through the loader as needed. In this regard, the loader of FIG. 10 need not include a movable carriage for accommodating any difference between filling and emptying the loader buckets, in distinction to the loaders of FIGS. 8 and 9.

Using the transfer system 20,22,24 described herein, a log 16 may be moved directly from a bucket 74 of the main accumulator to a bucket of the loader 106,126 and to a corresponding lane of the conveyor 118 of a log saw. This enhances quality control during processing as the process prevents logs from contacting each other. For instance, one defect commonly found when logs contact each other during processing involves glue transfer from the glue tail of one log to the surface of an adjacently touching log. Because the logs do not touch each other during transfer, problems with glue tail transfer are avoided. Another defect commonly found when logs contact each other during processing is scuffing of the surface of the logs. Another defect commonly found when logs contact each other during processing is misshapen logs. Another defect commonly found when logs contact each other during processing is the sealed end of the convolutely wound web at the outside of a log being caused to become unsealed.

In view of the foregoing, it will be seen that the several advantages of the invention are achieved and attained. The embodiments were chosen and described in order to best explain the principles of the disclosure and their practical application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent or explicit.

What is claimed is:

1. A processing line for processing a plurality of logs of convolutely wound web material, the processing line having an upstream section and a downstream section, the processing line comprising:
   a main accumulator having an endless loop with a plurality of main accumulator buckets, each bucket in the plurality of main accumulator buckets being adapted and configured to receive, hold, and release a log;
   an input feeder adapted and configured to receive a log from the upstream section of the processing line and convey the log to a bucket in the plurality of main accumulator buckets;
   a loader being adapted and configured with a loader accumulator, the loader having an endless loop with a plurality of loader buckets, each bucket in the plurality of loader buckets of the loader being adapted and configured to receive, hold, and release a log; and
   a transfer conveyor disposed between the main accumulator and the loader, the transfer conveyor being adapted and configured to receive a log from a main accumulator bucket in the plurality of main accumulator buckets, the transfer conveyor being adapted and configured to convey a log from a bucket in the plurality of the main accumulator buckets to a bucket in the plurality of loader buckets independently of the input feeder;

wherein the loader is adapted and configured to receive a log into a bucket in the plurality of loader buckets from the transfer conveyor; and wherein the loader is adapted and configured to convey a log in a bucket in the plurality of loader buckets to a discharge of the loader, the discharge of the loader is adapted and configured to discharge a log from a bucket of the plurality of loader buckets to the downstream section of the processing line.

2. The processing line of claim 1 wherein the downstream section of the processing line comprises a log saw.

3. The processing line of claim 2 wherein the discharge of the loader is aligned with a conveyor lane of the log saw.

4. The processing line of claim 1 wherein the downstream section of the processing line comprises first and second log saws.

5. The processing line of claim 1 further comprising a further loader, the further loader having a further loader accumulator, the further loader having an endless loop with a plurality of further loader buckets, each bucket in the plurality of further loader buckets being adapted and configured to receive, hold, and release a log; and wherein the transfer conveyor is disposed between the main accumulator and the further loader, the transfer conveyor is adapted and configured to receive a log from a main accumulator bucket in the plurality of main accumulator buckets, the transfer conveyor is adapted and configured to convey a log from a bucket in the plurality of the main accumulator buckets to a bucket in the plurality of further loader buckets independently of the input feeder and independently of conveying a log from a bucket in the plurality of the main accumulator buckets to a bucket in the plurality of loader buckets; and wherein the further loader is adapted and configured to receive a log into a bucket in the plurality of further loader buckets from the transfer conveyor;

wherein the further loader is adapted and configured to convey a log in a bucket in the plurality of further loader buckets to a discharge of the further loader, the discharge of the further loader is adapted and configured to discharge a log from a bucket of the plurality of further loader buckets to the downstream section of the processing line; and wherein the discharge of the further loader is adapted and configured to discharge a log from a bucket in the plurality of further loader buckets to the downstream section of the processing line independently of the discharge of the loader discharging a log from a bucket of the plurality of loader buckets to the downstream section of the processing line.

6. The processing line of claim 5 wherein the downstream section of the processing line comprises first and second log saws.

7. The processing line of claim 6 wherein the discharge of the loader is aligned with a conveyor lane of the first log saw, and the discharge of the further loader is aligned with a conveyor lane of the second log saw.

8. The processing line of claim 1 further comprising:

a further loader, the further loader having a further loader accumulator, the further loader having an endless loop with a plurality of further loader buckets, each bucket in the plurality of further loader buckets being adapted and configured to receive, hold, and release a log; and a further transfer conveyor disposed between the main accumulator and the further loader, the further transfer conveyor is adapted and configured to receive a log from a main accumulator bucket in the plurality of main accumulator buckets, the further transfer conveyor being adapted and configured to convey a log from a bucket in the plurality of the main accumulator buckets to a bucket of the plurality of further loader buckets independently of the input feeder;

wherein the further loader is adapted and configured to receive a log into a bucket in the plurality of further loader buckets from the further transfer conveyor;

wherein the further loader is adapted and configured to convey a log in a bucket in the plurality of further loader buckets to a discharge of the further loader, the discharge of the further loader is adapted and configured to discharge a log from a bucket of the plurality of further loader buckets to the downstream section of the processing line; and wherein the discharge of the further loader is adapted and configured to discharge a log from a bucket in the plurality of further loader buckets to the downstream section of the processing line independently of the discharge of the loader discharging a log from a bucket of the plurality of loader buckets to the downstream section of the processing line.

9. The processing line of claim 8 wherein the downstream section of the processing line comprises first and second log saws.

10. The processing line of claim 9 wherein the discharge of the loader is aligned with a conveyor lane of the first log saw, and the discharge of the further loader is aligned with a conveyor lane of the second log saw.

11. A processing line transfer system for transferring a plurality of logs of convolutely wound web material in the processing line between a main accumulator and a first downstream section and between the main accumulator and a second downstream section, wherein the main accumulator has an endless loop with a plurality of main accumulator buckets, and each bucket in the plurality of main accumulator buckets is adapted and configured to receive, hold, and release a log, the processing line transfer system comprising:

a first loader having an endless loop with a plurality of first loader buckets, each bucket in the plurality of first loader buckets being adapted and configured to receive, hold, and release a log;

a second loader having an endless loop with a plurality of second loader buckets, each bucket in the plurality of second loader buckets being adapted and configured to receive, hold, and release a log; and a transfer conveyor adapted and configured to be coupled to the main accumulator, the transfer conveyor being adapted and configured to be coupled to at least one of the first and second loaders, the transfer conveyor being adapted and configured to convey a log from a bucket in the plurality of the main accumulator buckets to a bucket of the at least one of the plurality of first loader buckets and the plurality of second loader buckets;

wherein each bucket in the at least one of the plurality of first loader buckets and second loader buckets is positionable on the corresponding first loader endless loop and second loader endless loop to receive a log from the transfer conveyor;

wherein the first loader is adapted and configured to convey a log in a bucket in the plurality of first loader buckets to a discharge of the first loader, the discharge of the first loader is adapted and configured to discharge a log from a bucket of the plurality of first loader buckets to the first downstream section;

wherein the second loader is adapted and configured to convey a log in a bucket in the plurality of second loader buckets to a discharge of the second loader, the discharge of the second loader is adapted and configured to discharge a log from a bucket of the plurality of second loader buckets to the second downstream section; and wherein the first loader discharge is adapted and configured to discharge a log from a bucket of the plurality of first loader buckets to the first downstream section independently of the second loader discharge discharging a log from a bucket of the plurality of second loader buckets to the second downstream section.

12. The processing line of claim 11 wherein the first and second downstream sections of the processing line comprise first and second log saws.

13. The processing line of claim 11 wherein the transfer conveyor is adapted and configured to convey a log from a bucket in the plurality of the main accumulator buckets to a bucket in the plurality of first loader buckets and to convey a log from a bucket in the plurality of the main accumulator buckets to a bucket in the plurality of second loader buckets.

14. The processing line of claim 12 wherein the transfer conveyor is adapted and configured to selectively convey a log from a bucket in the plurality of the main accumulator buckets to a bucket in the plurality of first loader buckets, and selectively convey a log from a bucket in the plurality of the main accumulator buckets to a bucket in the plurality of second loader buckets.

15. The processing line of claim 12 wherein the transfer conveyor is adapted and configured to move in a first direction to convey a log from a bucket in the plurality of the main accumulator buckets to a bucket in the plurality of first loader buckets, and in a second direction opposite the first direction to convey a log from a bucket in the plurality of the main accumulator buckets to a bucket in the plurality of second loader buckets.

16. The processing line of claim 11 wherein the transfer conveyor is adapted and configured to convey a log from a bucket in the plurality of the main accumulator buckets to a bucket in the plurality of first loader buckets; and the processing line transfer system further comprises a further transfer conveyor adapted and configured to be coupled between the main accumulator and the second loader, the further transfer conveyor being adapted and configured to convey a log from a bucket in the plurality of the main accumulator buckets to a bucket of the plurality of second loader buckets independently of the transfer conveyor;

wherein each bucket in the plurality of main accumulator buckets is positionable on the main accumulator endless loop to release a log to the further transfer conveyor, and each bucket in the plurality of second loader buckets is positionable on the second loader endless loop to receive a log from the further transfer conveyor.

17. A method of transferring a plurality of logs of convolutely wound web material between an upstream section and a downstream section of a processing line, the method comprising:

feeding a log from the upstream section of the processing line to a main accumulator wherein the main accumulator has an endless loop with a plurality of main accumulator buckets and each bucket in the plurality of main accumulator buckets is adapted and configured to receive, hold, and release a log, and the step of feeding includes conveying the log to a bucket in the plurality of main accumulator buckets;

conveying the log in a bucket in the plurality of main accumulator buckets;

transferring the log from the main accumulator to a loader, wherein the loader has a loader accumulator, the loader has an endless loop with a plurality of loader buckets and each bucket in the plurality of loader buckets is adapted and configured to receive, hold, and release a log, the step of transferring including conveying the log from a bucket in the plurality of the main accumulator buckets to a bucket in the plurality of loader buckets, wherein the step of conveying occurs independently of the step of feeding the log from the upstream section of the processing line to the main accumulator; and conveying the log in a bucket in the plurality of loader buckets to a discharge of the loader; and at the discharge, discharging the log from a bucket of the plurality of loader buckets to the downstream section of the processing line.

18. The method of claim 17 wherein the step of discharging the log from a bucket of the plurality of loader buckets to the downstream section of the processing line includes discharging the log to a conveyor lane of a log saw.

19. A method of transferring a plurality of logs of convolutely wound web material between an upstream section of a processing line and a downstream section of the processing line, the method comprising:

feeding a log from the upstream section of the processing line to a main accumulator wherein the main accumulator has an endless loop with a plurality of main accumulator buckets and each bucket in the plurality of main accumulator buckets is adapted and configured to receive, hold, and release a log, and the step of feeding includes conveying the log to a bucket in the plurality of main accumulator buckets;

conveying the log in a bucket in the plurality of main accumulator buckets;

transferring the log from the main accumulator to one of first and second loaders wherein each of the first and second loaders has an endless loop with a plurality of loader buckets and each bucket in the plurality of first and second loader buckets of the respective first and second loaders is adapted and configured to receive, hold, and release a log, the step of transferring includes conveying the log from a bucket in the plurality of the main accumulator buckets to a bucket of the one of the plurality of the first and second loader buckets, wherein the step of conveying occurs independently of the step of feeding the log from the upstream section of the processing line to the main accumulator; and conveying the log in a bucket of the one of the plurality of the first and second loader buckets to a discharge of the respective first and second loader; and at the discharge of the respective first and second loader, discharging the log from a bucket of the one of the plurality of the first and second loader buckets to the downstream section of the processing line.

20. The method of claim 19 wherein the step of conveying the log from a bucket in the plurality of the main accumulator buckets to a bucket of the one of the plurality of the first and second loader buckets includes one of operating a first transfer conveyor to convey the log from a bucket in the plurality of the main accumulator buckets to a bucket of the plurality of the first loader buckets and operating a second transfer conveyor to convey the log from a bucket in the plurality of the main accumulator buckets to a bucket of the plurality of the second loader buckets.

21. The method of claim 19 wherein the step of conveying the log from a bucket in the plurality of the main accumulator buckets to a bucket of the one of the plurality of the first and second loader buckets includes operating a transfer conveyor to perform one of conveying the log from a bucket in the plurality of the main accumulator buckets to a bucket of the plurality of the first loader buckets and conveying the log from a bucket in the plurality of the main accumulator buckets to a bucket of the plurality of the second loader buckets.

22. The method of claim 21 wherein the step of conveying the log from a bucket in the plurality of the main accumulator buckets to a bucket of the one of the plurality of the first and second loader buckets includes operating the transfer conveyor to selectively convey the log from a bucket in the plurality of the main accumulator buckets to a bucket of the plurality of the first loader buckets and selectively convey the log from a bucket in the plurality of the main accumulator buckets to a bucket of the plurality of the second loader buckets.

23. The method of claim 19 wherein the step of conveying the log from a bucket in the plurality of the main accumulator buckets to a bucket of one of the plurality of the first and second loader buckets includes operating the transfer conveyor in a first direction to convey the log from a bucket in the plurality of the main accumulator buckets to a bucket of the plurality of the first loader buckets and in a second direction opposite the first direction to convey the log from a bucket in the plurality of the main accumulator buckets to a bucket of the plurality of the second loader buckets.

24. The method of claim 19 further comprising aligning the discharge of the first loader with a conveyor lane of a first log saw, and aligning the discharge of the second loader with a conveyor lane of a second log saw.

\* \* \* \* \*